(12) United States Patent
Aldersley et al.

(10) Patent No.: US 12,722,563 B2
(45) Date of Patent: Sep. 1, 2026

(54) FASTENING ARRANGEMENT OF A LIGHTING DEVICE ON A STRUCTURAL ELEMENT OF A VEHICLE, AND A VEHICLE

(71) Applicant: Bayerische Motoren Werke Aktiengesellschaft, Munich (DE)

(72) Inventors: Nicholas Aldersley, Hebertshausen (DE); Bastian Bick, Munich (DE); Markus Halm, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/231,718

(22) Filed: Jun. 9, 2025

(65) Prior Publication Data

US 2025/0376107 A1 Dec. 11, 2025

(30) Foreign Application Priority Data

Jun. 10, 2024 (DE) ..................... 10 2024 116 060.8

(51) Int. Cl.
*B60Q 1/30* (2006.01)
*B60Q 1/26* (2006.01)
*F21S 43/19* (2018.01)

(52) U.S. Cl.
CPC ........... *B60Q 1/304* (2022.05); *B60Q 1/2626* (2013.01); *F21S 43/19* (2018.01)

(58) Field of Classification Search
CPC ........ B60Q 1/2626; B60Q 1/263; B60Q 1/26; B60Q 1/304; F21S 43/19
See application file for complete search history.

(56) References Cited

U.S. PATENT DOCUMENTS 4,488,206 A * 12/1984 Mizusawa ............ B60Q 1/0441 24/297
4,532,578 A * 7/1985 Gaden .................. B60Q 1/2607 362/544

(Continued)

FOREIGN PATENT DOCUMENTS

DE 10 2013 014 760 B4 4/2017
DE 10 2020 105 268 A1 9/2021

(Continued)

OTHER PUBLICATIONS

German-language Office Action issued in German Application No. 10 2024 116 060.8 dated Jan. 8, 2025 (5 pages).

(Continued)

*Primary Examiner* — Matthew J. Peerce
(74) *Attorney, Agent, or Firm* — Crowell & Moring LLP

(57) ABSTRACT

A fastening arrangement of a lighting device is provided, which is designed for lighting at least a partial region of an environment of a vehicle, on a structural element of the vehicle, in which the lighting device is fastened to the structural element via a fastening device. The fastening device has a first through opening of the structural element, the first through opening of which is penetrated by the lighting device such that a first partial region of the lighting device is arranged on a rear side of the structural element facing away from the environment and a second partial region of the lighting device is arranged on a front side of the structural element facing the environment. A clamping element is provided which is arranged on the rear side, is connected to the first partial region, and is clamped against the rear side, as a result of which the second partial region is clamped against the front side.

11 Claims, 2 Drawing Sheets

(56) References Cited

U.S. PATENT DOCUMENTS

| | | | | | |
|---|---|---|---|---|---|
| 4,796,165 | A * | 1/1989 | Metti | B60Q 1/2607 | 362/455 |
| 4,953,065 | A * | 8/1990 | Kao | B60Q 1/44 | 362/307 |
| 5,060,122 | A * | 10/1991 | Miyoshi | B60Q 1/2638 | 362/549 |
| 6,237,886 | B1 * | 5/2001 | Katsumata | B60Q 1/2615 | 248/222.12 |
| 10,533,596 | B2 * | 1/2020 | Ikada | F16B 33/02 | |
| 11,820,278 | B2 * | 11/2023 | Ubhayakar | B60Q 1/0441 | |
| 2018/0264991 | A1 | 9/2018 | Ellwanger | | |

FOREIGN PATENT DOCUMENTS

| | | | |
|---|---|---|---|
| DE | 10 2021 003 993 | A1 | 10/2021 |
| DE | 10 2015 015 841 | B4 | 1/2022 |
| DE | 10 2022 116 257 | A1 | 1/2024 |
| WO | WO 2020/043532 | A1 | 3/2020 |

OTHER PUBLICATIONS

English translation of German-language Decision to Grant issued in German Application No. 10 2024 116 060.8 dated Feb. 27, 2025 (5 pages).

* cited by examiner

FASTENING ARRANGEMENT OF A LIGHTING DEVICE ON A STRUCTURAL ELEMENT OF A VEHICLE, AND A VEHICLE

CROSS REFERENCE TO RELATED APPLICATION

This application claims priority under 35 U.S.C. § 119 from German Patent Application No. 10 2024 116 060.8, filed Jun. 10, 2024, the entire disclosure of which is herein expressly incorporated by reference.

BACKGROUND AND SUMMARY

The invention relates to a fastening arrangement of a lighting device on a structural element of a vehicle, in particular a motor vehicle. Furthermore, the invention relates to a vehicle having at least one such fastening arrangement.

DE 10 2013 014 760 B4 discloses a vehicle light for a motor vehicle, having a light housing and at least one adjustable fastening device arranged on the rear side of the light housing for fastening and adjusting the light housing to and on the vehicle body or a body add-on part. DE 10 2015 015 841 B4 discloses a light arrangement having two rear lights and at least one illuminable decorative trim. In addition, a lighting device for a motor vehicle is known from WO 2020/043532 A1.

It is the object of the present invention to provide a fastening arrangement of a lighting device on a structural element of a vehicle and a vehicle having at least one such fastening arrangement, such that a particularly advantageous fastening of the lighting device to the structural element can be realized.

This object is achieved by a fastening arrangement and by a vehicle having such a fastening arrangement in accordance with the independent claim(s). Advantageous refinements of the invention are the subject matter of the dependent claims.

A first aspect of the invention relates to a fastening arrangement of a lighting device, which is also referred to as a vehicle light, to a structural element of a vehicle, which structural element is in particular formed separately from the lighting device. The lighting device is designed for lighting at least a partial region of an environment of the vehicle. Preferably, the lighting device is a rear light which, in a fully manufactured state of the vehicle, which is preferably in the form of a motor vehicle, is arranged at a rear of the vehicle, such that preferably the partial region of the environment of the vehicle that is illuminable by means of the lighting device is located behind the vehicle in the longitudinal direction of the vehicle. Very preferably, the vehicle is a motor vehicle, in particular a passenger car, the interior of which, also referred to as a passenger cell, passenger compartment or cab, is formed by a body of the vehicle, for example, in the form of self-supporting bodywork. In principle, the structural element may be a bodywork component of the body. Furthermore, the structural element may be formed separately from the body and fastened to the body, in such a way that relative movements between the structural element and the body are prevented. Furthermore, the structural element may be held movably, in particular pivotably, on the body and thus to be movable, particularly pivotable, relative to the body. Very preferably, the structural element is a component part of a wing element of the vehicle, the wing element being formed separately from the body and being held movably, in particular pivotably, on the body. The wing element is, for example, a tailgate, which is also simply referred to as a flap and is arranged, for example, at the rear of the vehicle.

In the fastening arrangement, the lighting device is fastened to the structural element by means of a fastening device, in particular in such a way that relative movements between the structural element and the lighting device formed separately from the structural element are prevented. Thus, for example, the lighting device is movable, in particular pivotable, with the structural element relative to the body. The body has, for example, a body opening which is assigned to the wing element and is in the form of a through opening and which can be arranged, for example, at the rear of the vehicle. Considering the body by itself, the body opening opens, for example, at one end into the environment and at the other end into a storage compartment of the vehicle, in particular on the rear side and thus arranged at the rear, the storage compartment of the vehicle also being referred to as a luggage compartment or trunk. In this case, for example, the wing element is held on the body so as to be movable, in particular pivotable, relative to the body between a closed position and at least one open position. In the closed position, at least a partial region of the body opening is closed by the wing element. In the open position, the wing element opens up at least a partial region such that, in the open position of the wing element, for example, objects can be moved through the partial region and as a result, for example, can be moved from the environment into the storage compartment and thus arranged in the storage compartment. In addition, in the open position of the wing element, for example, objects arranged in the storage compartment can be moved through the opened up partial region and thus moved out of the storage compartment and moved to or into the environment, and thus can be removed from the storage compartment. In the closed position, for example, the wing element prevents objects arranged in the storage compartment from undesirably falling out of the storage compartment. The structural element forms, for example, at least a part of an outer skin of the vehicle, the outer skin of which is visually and haptically perceptible by a person in the vicinity of the vehicle, that is, can be seen and touched. For example, the structural element is made from metallic material, in particular sheet metal. Furthermore, the structural element may have a basic body, which can be formed, for example, from a metallic material, in particular from sheet metal. The basic body may be provided with a coating in the form, for example, of paintwork or else referred to as paintwork, with, for example, at least the part of the outer skin being formed by the coating.

In order now to be able to fasten the lighting device particularly advantageously to the structural element, it is provided according to the invention that the fastening device has a first through opening of the structural element. This means that the first through opening is formed in the structural element and completely penetrates the structural element. The first through opening is penetrated by the lighting device such that a first partial region of the lighting device is arranged on a rear side of the structural element facing away from the environment and a second partial region of the lighting device is arranged on a front side of the structural element facing the environment. At least in the closed position of the wing element, the front side faces the environment, and the rear side faces away from the environment. In particular, it is contemplated that, at least in the closed position of the wing element, the rear side faces the storage compartment, the front side facing away from the storage compartment, for example, at least in the closed position of the wing element. The front side faces away from the rear side, and vice versa. For example, it is provided that, at least in the closed position of the wing element, the front side faces rearward in the longitudinal direction of the vehicle, and therefore, for example, at least in the closed position of the wing element, the rear side of the structural element faces forward in the longitudinal direction of the vehicle.

The fastening device furthermore has a clamping element which is formed separately from the lighting device and separately from the structural element and is arranged on the rear side and which is also referred to as a claw or clamping claw. The clamping element is, in particular directly, connected to the first partial region of the lighting device and at least indirectly, in particular directly, clamped against the rear side, as a result of which the second partial region is at least indirectly, in particular directly, clamped against the front side. Preferably, the clamping element is clamped against the rear side, bypassing the lighting device. This means that the clamping element is clamped against the rear side not or not only by means of the lighting device. For example, the clamping element is clamped on the rear side of the structural element at least indirectly, in particular directly, against an edge region which adjoins the first through opening and bounds the first through opening, in particular directly. Because the clamping element is clamped against the rear side and that, in particular simultaneously, the clamping element is connected on the rear side to the first partial region, the second partial region is at least indirectly, in particular directly, clamped against the front side. Thus, it is contemplated, for example, that, at least in the closed position of the wing element, the clamping element is clamped rearward in the longitudinal direction of the vehicle against the rear side at least indirectly, in particular directly and/or bypassing the lighting device, and, for example, at least in the closed position of the wing element, the second partial region is then clamped forward in the longitudinal direction of the vehicle against the front side. By the clamping element being clamped against the rear side and by the resulting clamping of the second partial region against the front side, the lighting device is held on the structural element and thus fastened.

Furthermore, it is provided according to the invention that the fastening device has a second through opening of the structural element, which second through opening is arranged next to the first through opening, is spaced apart from the first through opening and separated from the first through opening. This means that the second through opening is formed in the structural element. The first through opening completely penetrates the structural element. The second through opening completely penetrates the structural element. Preferably, the first through opening is bounded completely circumferentially along its circumferential direction and directly by a first wall region of the structural element, which wall region is in the form of a solid body, and therefore the first wall region extends completely circumferentially around the first through opening in the circumferential direction of the first through opening. Preferably, the second through opening is bounded completely circumferentially along its circumferential direction directly by a second wall region of the structural element, which wall region is in the form of a solid body, and therefore the second wall region extends completely circumferentially around the second through opening in the circumferential direction of the second through opening, and thus completely circumferentially surrounds the second through opening in the circumferential direction of the second through opening. The first through opening and the second through opening are not connected to each other, and thus do not merge into each other, but rather a region of the structural element, which region is in the form of a solid body, is arranged between the first through opening and the second through opening, wherein the region, for example, may comprise a part of the first wall region and a second part of the second wall region, and optionally a third wall region of the structural element, which wall region is arranged between the parts.

The fastening device has a first screw element of the lighting device, the screw element penetrating the second through opening, such that the first screw element is a component part of the lighting device. Owing to the fact that the first screw element penetrates the second through opening, at least a part of the first screw element is arranged on the rear side.

The fastening device also has a second screw element which is arranged on the rear side, is preferably formed separately from the first screw element and is screwed, in particular directly, to the first screw element and thus clamped at least indirectly, in particular directly, against the rear side, as a result of which the second partial region is clamped against the front side. Preferably, the second screw element is clamped against the rear side bypassing the lighting device. It is contemplated that, at least in the closed position of the wing element, the second screw element is clamped rearward in the longitudinal direction of the vehicle against the rear side. The first screw element has, for example, a first thread, which is designed, for example, as an external thread. The second screw element has, for example, a second thread which corresponds to the first thread and is designed, for example, as an internal thread. The threads are, for example, screwed together, in particular directly, in particular in such a way that, for example, the external thread is screwed, in particular directly, into the internal thread. Thus, for example, the second screw element is screwed, in particular directly, onto the first screw element and thus screwed to the first screw element. Owing to the fact that the second screw element is clamped against the rear side and that, as a result, the second partial region is clamped against the front side, the lighting device is particularly fixedly fastened to the structural element. Owing to the fact that the second screw element is screwed to the first screw element, a screw joint also referred to as a screw connection is provided. By means of the clamping element, a clamping claw fastening is provided, in which the clamping element is clamped against the rear side and, as a result, the second partial region is clamped against the front side. It can be seen that the screw joint is provided in addition to the clamping claw fastening and vice versa, as a result of which the lighting device can be fixedly and stably fastened to the structural element. The invention thus provides for a combination of the screw joint and the clamping claw fastening. By means of this combination, for example, what are referred to as excessive sizes of the first through opening and an excessive size of the second through opening can be avoided, such that an excessive weakening of the structural element caused by the first through opening and by the second through opening can be avoided. In other words, an advantageous stability and/or rigidity of the structural element can be realized. At the same time, for example, the lighting device can be configured with a particularly large length running, for example, in the transverse direction of the vehicle, which length is larger than, in particular at least twice as large and very particularly at least three times as large as, a height of the lighting device running in the vertical direction of the vehicle, the height of the lighting device, for example, at least in the closed position of the wing element, running in the vertical direction of the vehicle. The invention makes it possible to fasten the lighting device particularly advantageously to the structural element, with a costly pot solution being able to be avoided. Such a pot solution conventionally has to be used if the lighting device has a particularly large width running in the transverse direction of the vehicle. By means of the above-mentioned combination of the screw joint and the clamping claw fastening, such a pot solution can now be avoided, and the lighting device can be advantageously fastened to the structural element.

By means of the combination of the screw joint formed, in particular, as a direct screw joint and the clamping claw fastening arranged next to it, a particularly large length or width, in particular running in the transverse direction of the vehicle, can be realized, via which the lighting device is fastened to the structural element, with the clamping claw fastening only being part of this length or width or only running over part of this length or width.

In a particularly advantageous embodiment of the invention, it is provided that the first partial region of the lighting device has a third screw element which is provided in particular in addition to the first screw element and in addition to the second screw element. The clamping element has a third through opening which is provided in addition to the first through opening and in addition to the second through opening and is, for example, directly bounded along its circumferential direction completely circumferentially by a wall region of the clamping element, which wall region is in the form of a solid body. The third screw element penetrates the third through opening. A fourth screw element, which is formed in particular separately from the third screw element, is screwed, in particular directly, to the third screw element, as a result of which the fourth screw element is clamped, in particular directly, against a side of the clamping element facing away from the rear side, and the clamping element is clamped against the rear side. By this means, the clamping element can be particularly fixedly clamped against the rear side and, as a result, the second partial region can be particularly fixedly clamped against the front side, so that a particularly advantageous fastening of the lighting device can be produced.

In order to be able to fasten the lighting device particularly advantageously to the structural element, it is provided, in a further refinement of the invention, that the second through opening follows the first through opening in the transverse direction of the vehicle. By this means, the lighting device can be particularly advantageously fastened to the structural element, in particular even when the lighting device has a particularly large width running in the transverse direction of the vehicle.

It has been shown to be particularly advantageous if the second through opening follows the first through opening inward in the transverse direction of the vehicle. Thus, the lighting device can be particularly advantageously fastened to the structural element without a pot solution being required.

Another embodiment is distinguished in that the first through opening is arranged in an indentation in the structural element, which indentation is also referred to as the first indentation. By this means, a high rigidity of the structural element can be ensured, as a result of which the lighting device can be particularly advantageously fastened to the structural element. Where mention is made above and below to the indentation, it should be understood as meaning the first indentation, unless stated otherwise.

Very particularly, it is provided that the second partial region is at least partially arranged in the indentation. Thus, it is preferably provided that, at least in the closed position of the wing element, the structural element is recessed forward in the longitudinal direction of the vehicle by the indentation.

In order to realize a particularly high rigidity of the structural element and thus a particularly advantageous fastening of the lighting device to the structural element, it is provided, in a further refinement of the invention, that the indentation is formed by a stamping, thus by stamping of the structural element.

In another, particularly advantageous embodiment of the invention, it is provided that in the indentation there is a second indentation in the structural element, which, at least in the closed position of the wing element, is preferably recessed forward in the longitudinal direction of the vehicle by the second indentation. It is preferably provided that the second through opening is arranged in the second indentation. By this means, a high rigidity of the structural element can be realized, such that the lighting device can be particularly advantageously fastened to the structural element.

In this case, it has been shown to be particularly advantageous for the realization of a particularly high rigidity of the structural element and thus a particularly advantageous fastening of the lighting device to the structural element, if the second indentation is formed by a stamping, thus by stamping of the structural element.

In another refinement of the invention, it is provided that the first through opening and the second through opening are formed in a wall of the structural element, which wall is formed from a single piece and is therefore integral. This means that the wall is formed by a body which is formed integrally, thus is formed from a single piece and is therefore produced integrally and thus as a monobloc, with the first through opening and the second through opening being formed, in particular in each case completely, in the body. As a result, a particularly high rigidity of the structural element can be realized, as a result of which the lighting device can be particularly advantageously fastened to the structural element.

A second aspect of the invention relates to a vehicle, which is preferably in the form of a motor vehicle, in particular a motor car, and very particularly a passenger car, and which has at least one fastening arrangement according to the first aspect of the invention. Advantages and advantageous refinements of the first aspect of the invention can be considered to be advantages and advantageous refinements of the second aspect of the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

In the FIGURES, identical or functionally identical elements are provided with the same reference signs.

DETAILED DESCRIPTION OF THE DRAWINGS

Figure 1:
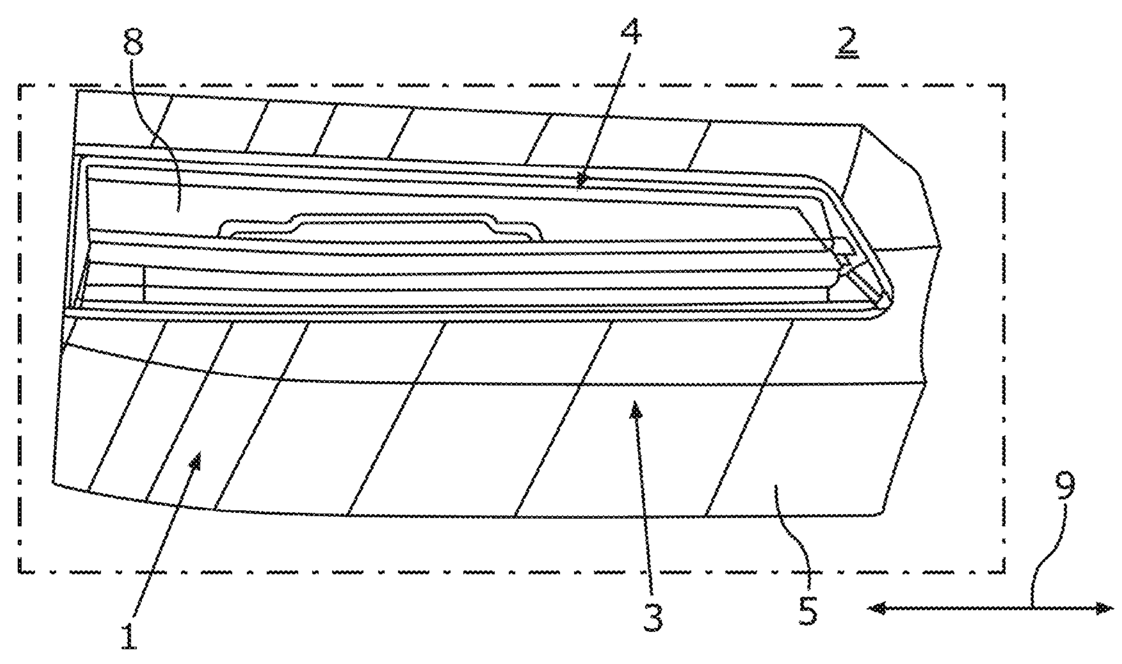
FIG. 1 shows part of a schematic rear view of a vehicle having a fastening arrangement in which a lighting device in the form of a rear light is fastened to a structural element of a tailgate of the vehicle.

FIG. 1 shows part of a schematic rear view of a vehicle, the interior of which, also referred to as a passenger cell, passenger compartment or cab, is formed by a body, for example, in the form of self-supporting bodywork. There may be people in the interior while the vehicle is moving. In the exemplary embodiment shown in the FIGURES, the vehicle is a passenger car and thus a motor car, which is also referred to as a motor vehicle. The vehicle has a wing element formed separately from the body in the form of a tailgate 1, which is simply referred to as a flap and which is arranged at a rear of the vehicle and thus of the body. The tailgate 1 is held on the body so as to be pivotable about a pivot axis relative to the body, the pivot axis running, for example, in the transverse direction of the vehicle. Thus, the tailgate 1 can be pivoted between a closed position and at least one open position relative to the body, while the tailgate 1 is held on the body, thus is connected to the body. The tailgate 1 is assigned to an opening of the body, which opening is arranged at the rear and thus on the rear side, and is also referred to as a body opening or bodywork opening and is in the form of a through opening. Considering the body by itself, the body opening opens at one end at or into an environment 2 of the body and at the other end into a storage compartment of the body, and thus of the passenger car, which storage compartment is arranged at the rear and thus on the rear side. Items such as luggage items can be transported in the storage compartment. In the closed position, the body opening is closed at least partially, in particular completely, by the tailgate 1. In the open position, the tailgate 1 opens up at least a partial region of the body opening such that, in the open position of the tailgate 1, objects can be moved from the environment 2 through the partial region and thus can be moved into the storage compartment and thus can be arranged in the storage compartment. In addition, in the open position of the tailgate 1, for example, objects first of all arranged in the storage compartment can be moved through the partial region of the body opening and thus moved out of the storage compartment and moved to or into the environment 2.

Figure 2:
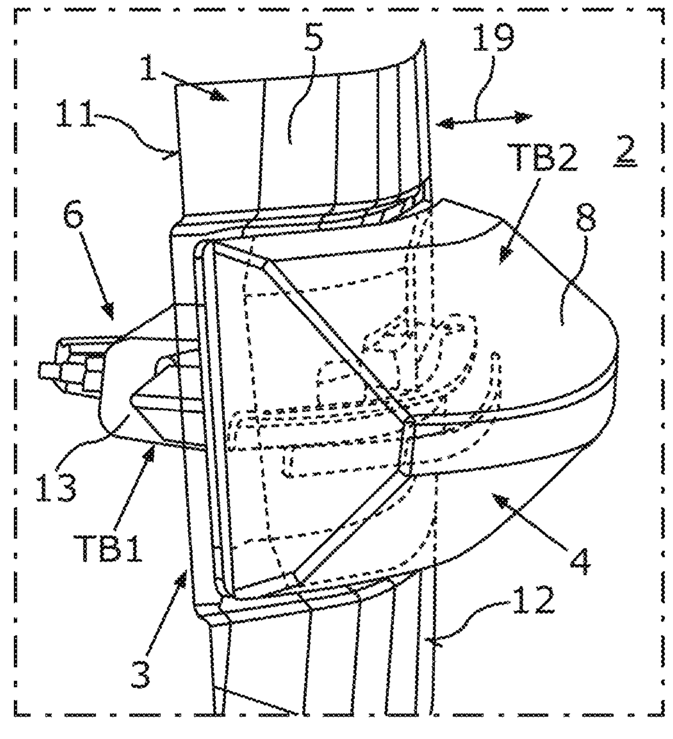
FIG. 2 shows part of a schematic and perspective side view of the fastening arrangement.

The vehicle has a fastening arrangement 3 which can be seen in FIGS. 1 and 2 and in which a lighting device 4 of the vehicle is fastened to a structural element 5 of the vehicle. The lighting device 4 is formed separately from the structural element 5 and fastened to the structural element 5, in particular in such a way that relative movements between the structural element 5 and the lighting device 4 are prevented. The structural element 5 may be the tailgate 1. In the exemplary embodiment shown in the FIGURES, the structural element 5 is a component part of the tailgate 1, which can thus have the structural element 5 and, for example, at least one further structural element which is formed separately from the structural element 5 and is at least indirectly, in particular directly, connected to the structural element 5. The further structural element is, for example, a trim panel, in particular an inner trim panel, by means of which, for example, at least a partial region of the structural element 5 is overlapped and thus covered, in particular in such a way that, at least in the closed position of the tailgate 1, at least the partial region of the structural element 5 is overlapped, and thus covered, forward in the longitudinal direction of the vehicle and thus toward the storage compartment by means of the trim panel. In the exemplary embodiment shown in the FIGURES, the structural element 5 is formed from a metallic material such as, for example, from a light metal, in particular aluminum, or from steel, and therefore, for example, the structural element 5 is formed as a metal sheet or from sheet metal. Since the structural element 5 is a structural element of the tailgate 1, the structural element 5 is pivotable about the pivot axis relative to the body between the open position and the closed position. Since the lighting device 4 is fastened to the structural element 5 and thus to the tailgate 1, the lighting device 4 formed separately from the tailgate 1 and fastened to the tailgate 1 is pivotable with the tailgate 1 about the pivot axis relative to the body between the open position and the closed position. In the exemplary embodiment shown in the FIGURES, the lighting device is a rear light, by means of which at least a partial region of the environment 2 of the body and the vehicle as a whole can be lit. At least in the closed position of the tailgate 1, the partial region of the environment 2 which can be lit by means of the rear light is arranged behind the vehicle in the longitudinal direction of the vehicle.

Figure 3:
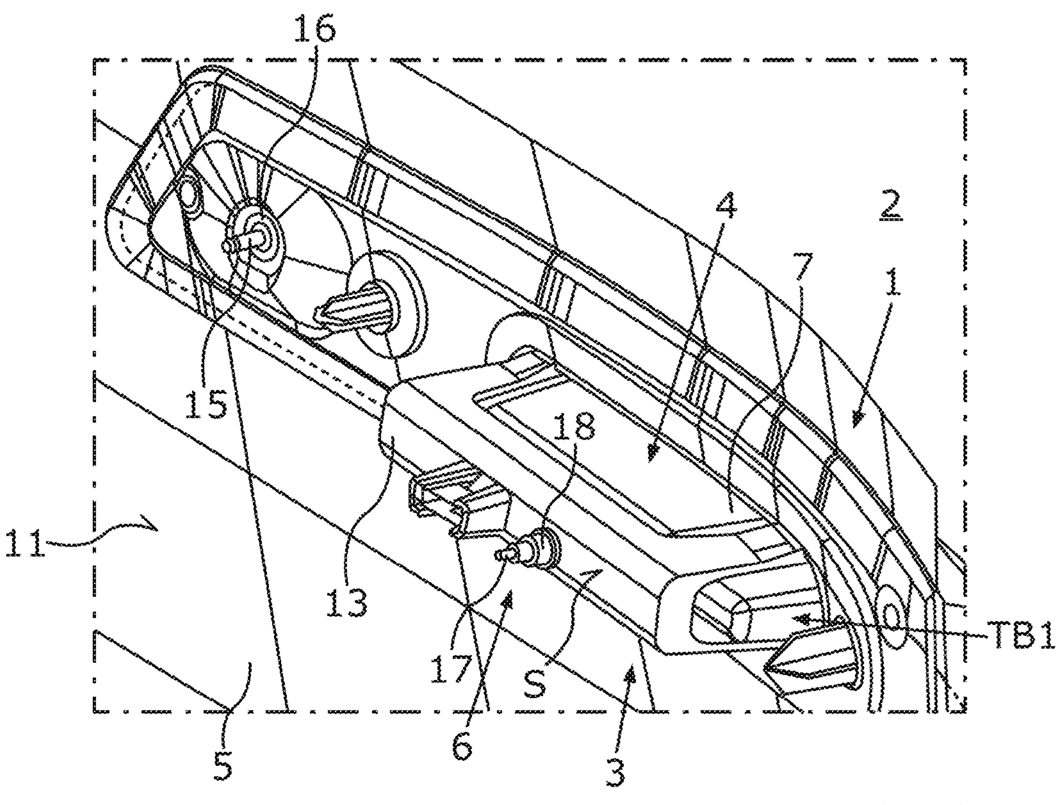
FIG. 3 shows part of a schematic and perspective rear view of the fastening arrangement.

From an overall view of FIGS. 1 to 3, it can be seen that, in the fastening arrangement 3, the lighting device 4 is fastened by means of a fastening device 6 to the structural element 5 and thus to the tailgate 1, in particular in such a way that relative movements between the lighting device 4 and the structural element 5, in particular between the lighting device 4 and the tailgate 1 as a whole, are prevented. It can be seen from FIGS. 1 to 3 that the lighting device 4 in the form of the rear light has a housing 7, which is also referred to as a light housing and in which at least one light source is arranged. The light source is designed to provide light which is perceptible by the human eye and is thus visible for lighting at least the partial region of the environment 2. Furthermore, the lighting device 4 has, for example, a light-permeable lens 8 which is thus permeable in particular for the light mentioned and is also referred to as a cover lens, which is formed, for example, separately from the housing 7 and is connected at least indirectly, in particular directly, to the housing 7. The light provided by the light source can penetrate the lens 8 and thus reach the environment 2.

It can be seen from FIG. 1 that the lighting device 4 has a particularly large width running, at least in the closed position of the tailgate 1, in the transverse direction of the vehicle, the transverse direction of the vehicle being illustrated by a double arrow 9. In order now, despite the very large width of the lighting device 4, to be able to fasten the lighting device 4 particularly advantageously to the structural element 5 and thus to the tailgate 1, the fastening device 6 has a first through opening 10, which can be seen particularly well in FIG. 4, of the structural element 5. It can be seen from FIG. 4 that the through opening 10 is completely circumferentially surrounded along its circumferential direction by a first wall region WB1 of the structural element 5 and is completely circumferentially bounded along its circumferential direction directly by the wall region WB1. The through opening 10 completely penetrates the structural element 5. It can be seen from FIGS. 2 to 4 that the lighting device 4 penetrates through the through opening 10, in particular completely, such that a first partial region TB1 of the lighting device 4 is arranged on a rear side 11 of the structural element 5 and a second partial region TB2 of the lighting device 4 is arranged on a front side 12 of the structural element 5 facing away from the rear side 11. At least in the closed position of the tailgate 1, the rear side 11 faces away from the environment 2, and, in the exemplary embodiment shown in the FIGURES, at least in the closed position of the tailgate 1, the rear side 11 faces forward in the longitudinal direction of the vehicle. The longitudinal direction of the vehicle is shown in FIG. 2 by a double arrow 19. At least in the closed position of the tailgate 1, the front side 12 faces the environment 2, and, in the exemplary embodiment shown in the FIGURES, at least in the closed position of the tailgate 1, the front side 12 faces rearward in the longitudinal direction of the vehicle. Thus, at least in the closed position of the tailgate 1, the rear side 11 faces the storage compartment and, at least in the closed position of the tailgate 1, the rear side 11 faces forward in the longitudinal direction of the vehicle. For example, the aforementioned trim panel is arranged on the rear side 11, so that, for example, at least the previously mentioned partial region of the rear side 11 is overlapped and thus covered by means of the trim panel. For example, the rear side 11 is or forms a part of an outer skin of the vehicle, the outer skin of which can be perceived visually and haptically by a person in the environment 2 of the vehicle.

It can be seen, for example, from FIG. 2 that the second partial region TB2 has at least part of the lens 8. It can be seen from FIG. 3 that, for example, the partial region TB1 has at least a part of the housing 7.

The fastening device 6 also has a clamping element 13 which is formed separately from the lighting device 4 and separately from the structural element 5 and is arranged on the rear side 11 and which is also referred to as a claw or clamping claw, and which is connected, in particular directly, to the first partial region TB1 and bypassing the lighting device 4 and in the present case, for example, is clamped directly against the rear side 11, as a result of which the second partial region TB2 is at least indirectly, in particular directly, clamped against the front side 12.

Figure 4:
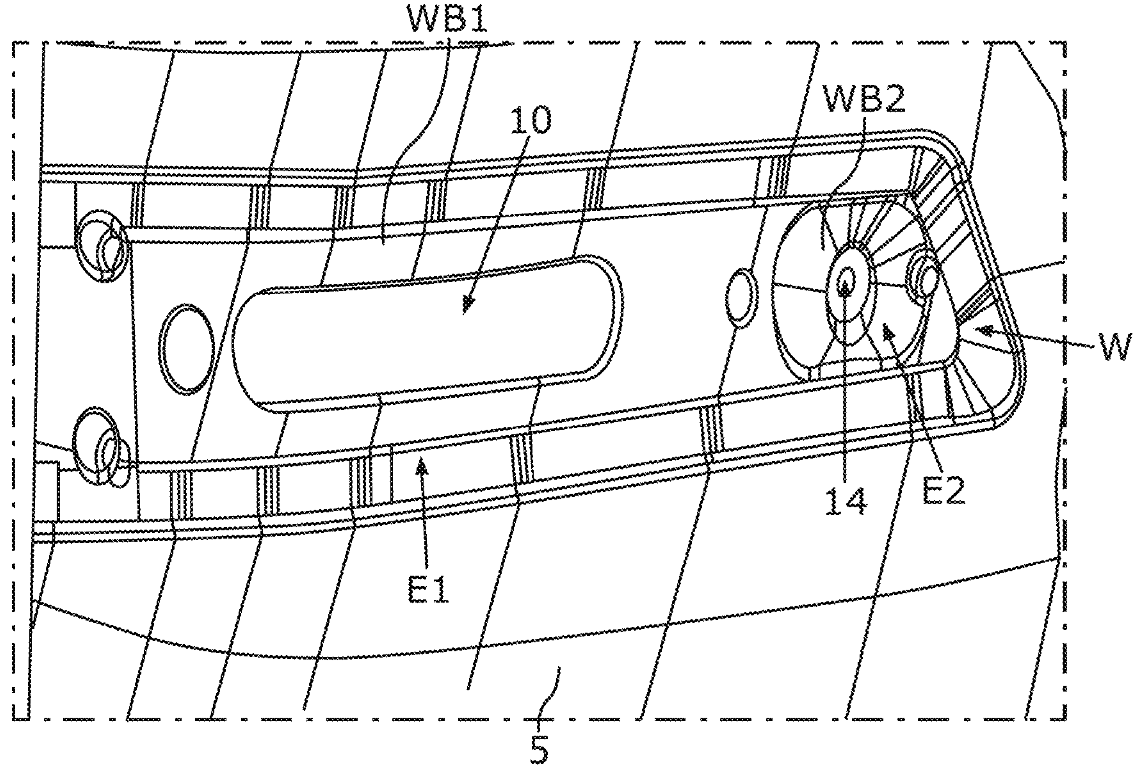
FIG. 4 shows part of a schematic perspective view of the structural element.

The fastening device 6 also has a second through opening 14 which can be seen particularly well from FIG. 4 and is arranged next to the first through opening 10. The second through opening 14 is completely circumferentially surrounded along its circumferential direction by a second wall region WB2 of the structural element 5 and is completely circumferentially bounded along its circumferential direction and directly by the second wall region WB2. The wall areas WB1 and WB2 are in the form of solid bodies. In addition, the wall regions WB1 and WB2 here are formed integrally with each other, that is, are formed from a single piece. Thus, the wall regions WB1 and WB2 are formed by an integral body which is thus formed from a single piece and is therefore produced integrally and thus as a monobloc. The through opening 14 completely penetrates the structural element 5. It can also be seen from FIG. 4 that the through openings 10 and 14 are spaced apart from each other and separated from each other.

The fastening device 6 has a first screw element 15 (FIG. 3) of the lighting device 4, the screw element 15 penetrating the through opening 14. In the exemplary embodiment shown in the FIGURES, the screw element 15 is a bolt which is also referred to as a screw bolt and has a first thread in the form of a first external thread. The fastening device 6 has a second screw element 16 which is formed separately from the screw element 15 and separately from the lighting device 4 and separately from the structural element 5 and is arranged on the rear side 11. In the exemplary embodiment shown in the FIGURES, the second screw element 16 is a nut which has a second thread which corresponds to the first thread and is in the form of a first internal thread. The screw element 16 is screwed, in the present case directly, to the screw element 15 and thus at least indirectly, in particular directly, clamped against the rear side 11, as a result of which the second partial region TB2 is at least indirectly, in particular directly, clamped against the front side 12. In the exemplary embodiment shown in the FIGURES, the screw elements 15 and 16 are screwed together, in particular directly, in such a way that the first external thread is screwed, in particular directly, to the first internal thread, and thus the first external thread is screwed, in particular directly, into the first internal thread. Thus, the screw element 16 is screwed, in particular directly, onto the screw element 15.

The screw elements 15 and 16 screwed together form a screw joint, which is also referred to as a screw connection and by means of which the partial region TB2 is clamped against the front side 12. The clamping element 13, also referred to as a clamping claw, forms a so-called clamping claw fastening, by means of which the partial region TB2 is also clamped against the front side 12. It can be seen that the screw joint is provided in addition to the clamping claw fastening and vice versa. In other words, in the fastening arrangement 3, a combination of the screw joint and the clamping claw fastening mentioned is realized, as a result of which the lighting device 4, despite its particularly large width, can be advantageously fastened to the structural element 5 and thus to the tailgate 1. In particular, the lighting device 4 can be fastened to the structural element 5 without having to use a costly pot solution. Furthermore, an advantageous rigidity of the structural element 5 can be realized, in particular by the fact that the respective through opening 10, 14 does not have to be excessively large.

It can be seen from FIG. 3 that the first partial region TB1 has a third screw element 17. This means that the lighting device 4 has the screw element 17 in its partial region TB1. In the exemplary embodiment shown in the FIGURES, the screw element 17 is a second bolt which is also referred to as a second screw bolt and has a third thread in the form of a second external thread. The screw element 17 penetrates a third through opening of the clamping element 13, which through opening cannot be seen in the FIGURES. The fastening device 6 has a fourth screw element 18 which is formed separately from the lighting device 4, separately from the screw element 17 and separately from the clamping element 13. In the exemplary embodiment shown in the FIGURES, the screw element 18 is in the form of a second nut which has a fourth thread which corresponds to the third thread and is in the form of a second internal thread. It can be seen from FIG. 3 that the screw element 18 is screwed to the screw element 17, as a result of which the fourth screw element 18 is clamped, at least indirectly, in particular directly, against a side S of the clamping element 13 facing away from the rear side 11. This causes the clamping element 13 to be clamped against the rear side 11. The screw elements 17 and 18 are screwed together, in particular directly, in such a way that the fourth thread and the third thread are screwed together, in particular directly. This is realized here in such a way that the second external thread is screwed, in particular directly, into the internal thread, such that here the screw element 18 is screwed, in particular directly, onto the screw element 17.

It can be seen that, in the exemplary embodiment shown in the FIGURES, the clamping element 13 is connected on the rear side 11 to the first partial region TB1 in such a way that the screw element 17 penetrates the third through opening, the screw elements 17 and 18 are screwed together and thus the screw element 18 is at least indirectly, in particular directly, clamped against the side S.

In order to be able to realize a particularly advantageous fastening of the lighting device 4 to the structural element 5 and thus to the tailgate 1, it is provided in the fastening arrangement 3 that the second through opening 14 follows the first through opening 10 inward in the transverse direction of the vehicle.

It can be seen from FIG. 4 that the first through opening 10 is arranged, in particular completely, in a first indentation E1 of the structural element 5. The second through opening 14 is arranged, in particular completely, in a second indentation E2 of the structural element 5, the second indentation E2 being arranged, in particular completely, in the first indentation E1. The respective indentation E1, E2 is formed by a respective stamping of the structural element 5, and therefore, in the exemplary embodiment shown in the FIGURES, a double stamping of the structural element 5 is provided to form the indentations E1 and E2. By this means, an advantageous hollow rigidity of the structural element 5 can be produced. In addition, it is provided that the through openings 10 and 14 are each completely formed in a wall W of the structural element 5, which wall is formed from a single piece and is therefore formed integrally. The wall W comprises the wall regions WB1 and WB2, such that, for example, the wall W and thus the wall regions WB1 and WB2 are formed by the aforementioned, integral body, which is thus formed from a single piece and is in the form of a monobloc. In particular, the structural element 5 may be formed integrally as a whole, and thus to be formed from a single piece. For the purposes of the present disclosure, the feature that an element, such as the wall W, is formed integrally, i.e., is formed from a single piece, should be understood as meaning that the element is not formed, for example, from a plurality of, separately formed and interconnected structural elements, but the element is formed from a single piece and is thus formed as one part, i.e., is formed as a monobloc which is integrally manufactured, i.e., is formed from a single piece.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Tailgate
2 Environment
3 Fastening arrangement
4 Lighting device
5 Structural element
6 Fastening device
7 Housing
8 Lens
9 Double arrow
10 First through opening
11 Rear side
12 Front side
13 Clamping element
14 Second through opening
15 First screw element
16 Second screw element
17 Third screw element
18 Fourth screw element
19 Double arrow
E1 First indentation
E2 Second indentation
S Side
TB1 First partial region
TB2 Second partial region
W Wall
WB1 First wall region
WB2 Second wall region

What is claimed is:

1. A fastening arrangement for a lighting device on a structural element of a vehicle, the lighting device being configured to light at least a partial region of an environment of the vehicle, comprising:

a fastening device by which the lighting device is fastened to the structural element, the fastening device comprising:

at least one first through opening of the structural element, the first through opening of which is penetrated by the lighting device such that a first partial region of the lighting device is arranged on a rear side of the structural element facing away from the environment and a second partial region of the lighting device is arranged on a front side of the structural element facing the environment;

at least one clamping element which is arranged on the rear side, is connected to the first partial region, and is clamped against the rear side, as a result of which the second partial region is clamped against the front side;

at least one second through opening of the structural element, which second through opening is arranged next to the first through opening, is spaced apart and is separated from the first through opening;

at least one first screw element of the lighting device, the screw element having threads and penetrating the second through opening; and at least one second screw element which is arranged on the rear side, is screwed to the first screw element and thus clamped against the rear side, as a result of which the second partial region is clamped against the front side.

2. The fastening arrangement according to claim 1, wherein the first partial region has a third screw element which penetrates a third through opening of the clamping element and to which a fourth screw element is screwed, as a result of which the fourth screw element is clamped against a side of the clamping element facing away from the rear side and the clamping element is clamped against the rear side.

3. The fastening arrangement according to claim 1, wherein the second through opening follows the first through opening in a direction transverse with respect to a travel direction of the vehicle.

4. The fastening arrangement according to claim 3, wherein the second through opening follows the first through opening inward in the transverse direction of the vehicle.

5. The fastening arrangement according to claim 1, wherein the first through opening is arranged in an indentation in the structural element.

6. The fastening arrangement according to claim 5, wherein the indentation is formed by a stamping of the structural element.

7. The fastening arrangement according to claim 5, wherein in the indentation, there is a second indentation in the structural element, in the second indentation of which the second through opening is arranged.

8. The fastening arrangement according to claim 7, wherein the second indentation is formed by a stamping of the structural element.

9. The fastening arrangement according to claim 1, wherein the first and second through openings are formed in a wall of the structural element, which wall is formed from a single piece.

10. A vehicle comprising at least one fastening arrangement according to claim 1.

11. The fastening arrangement according to claim 1, wherein the threads of the third screw element are external, and the threads of the fourth screw element are internal.

* * * * *